United States Patent [19]

Nonaka et al.

[11] Patent Number: 4,829,468
[45] Date of Patent: May 9, 1989

[54] PRINT CONTROL SYSTEM

[75] Inventors: Naomichi Nonaka; Keiichi Nakane; Tadashi Kuwabara; Hiroyuki Koreeda; Kazunari Suzuki, all of Yokohama; Kiyoshi Masuda, Hitachi, all of Japan

[73] Assignees: Hitachi, Ltd.; Hitachi Microsoftware Systems, Inc., both of Tokyo, Japan

[21] Appl. No.: 98,385

[22] Filed: Sep. 18, 1987

[30] Foreign Application Priority Data
Sep. 19, 1986 [JP] Japan .............. 61-219635

[51] Int. Cl.⁴ ................................................ G06F 3/12
[52] U.S. Cl. .................................... 364/900; 364/943; 364/943.5; 364/967.1; 364/957.1; 364/967; 364/957
[58] Field of Search ... 364/200 MS File, 900 MS File

[56] References Cited
U.S. PATENT DOCUMENTS

| | | | |
|---|---|---|---|
| 3,911,407 | 10/1975 | Greek, Jr. et al. | 364/900 |
| 3,958,224 | 5/1976 | Boyd et al. | 364/900 |
| 4,250,560 | 2/1981 | Dethloff et al. | 364/900 |
| 4,393,463 | 7/1983 | Aiken, Jr. | 364/900 |
| 4,480,314 | 10/1984 | McKelley, Jr. et al. | 364/900 |
| 4,585,360 | 4/1986 | Ueda | 364/900 |

Primary Examiner—Thomas M Heckler
Attorney, Agent, or Firm—Antonelli, Terry & Wands

[57] ABSTRACT

A print control system for controlling a computer system comprising a processing unit, a memory unit, a display unit, an input unit and a printer. The memory unit has print request blocks each for storing information necessary for printing a document, and an area for storing a print queue for defining the print execute order of the print request blocks. The processing unit executes a print request program through which a print request provided by the operator is set together with necessary information in the print request block and the print request block is added to the print queue, a print execute program through which information stored in the print request blocks is fetched sequentially in the order of registration of the print request block in the print queue and the printer is controlled for printing operation on the basis of the information, a printing status operating program through which the contents of the print queue are displayed on the display unit, the print request block is removed from the print queue and the order of the print request blocks in the print queue is changed in conformity to instructions given by the operator, and a system management program through which those programs are activated for controlling the printing operation.

15 Claims, 10 Drawing Sheets

PRINT REQUEST BLOCK (PRB)

| | |
|---|---|
| 411 | LINK POINTER |
| 412 | FILE NAME TO BE PRINTED |
| 413 | FILE KIND TO BE PRINTED |
| 414 | TEMPORARY FILE NAME FOR PRINTING |
| 415 | TEMPORARY FILE NAME FOR PRINTING PARAMETER |
| 416 | PRINT PROGRAM NUMBER |
| 418 | PRINT PARAMETER SET PROGRAM NUMBER |
| 419 | PRINT PARAMETER SET FLAG |

FIG. 9A
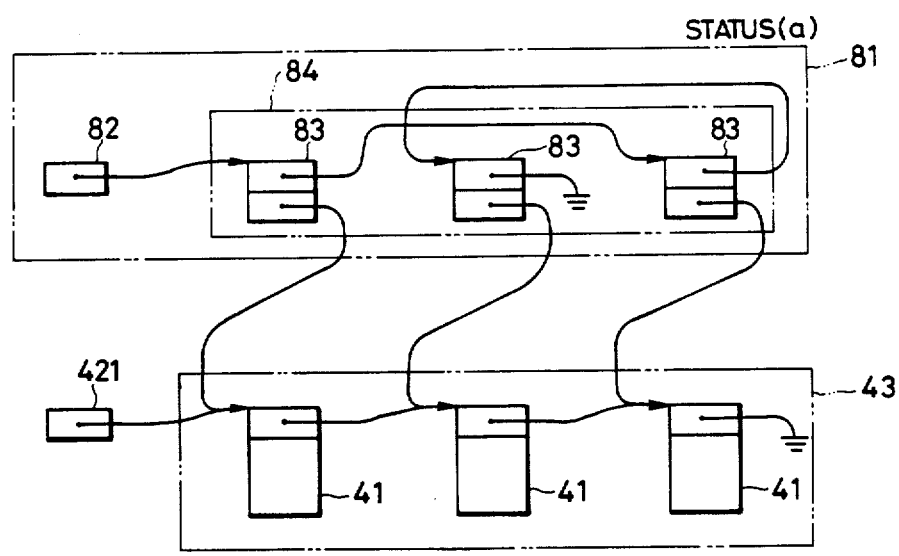
FIG. 9B
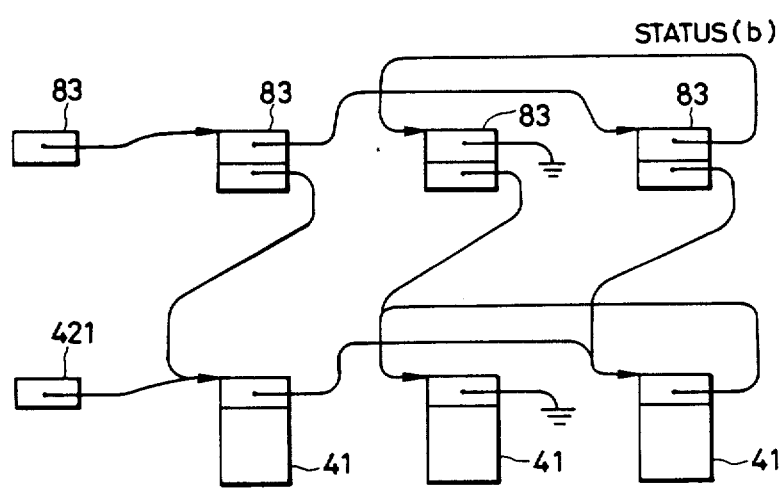

PRINT CONTROL SYSTEM

BACKGROUND OF THE INVENTION

The present invention relates to a print control system for controlling computer systems for creating documents, such as personal computers and word processors and, more specifically, to a print control system suitable for controlling the operation of such computer systems for printing documents in large quantities by a printer.

The computer system, such as the personal computer or the word processor, comprises a processing unit, a storage unit, a display unit, an input unit and a printing unit, and is capable, in general, of an editing function.

The conventional computer system of this kind is capable of parallel execution of a printing task and an editing task and is capable of simultaneously giving print instructions for a plurality of documents. However, the conventional computer system is unable to identify a document in printing process. Furthermore, once a print instruction is given, it is impossible to cancel the print job specified by the print instruction and to change the print sequence.

Since the conventional computer system is not designed to enable the cancellation and change of a print instruction after the print instruction has been given, the conventional computer system has drawbacks in accessibility.

SUMMARY OF THE INVENTION

Accordingly, it is an object of the present invention to provide a print control system capable of cancelling a print instruction through conversational operation and changing a print sequence specified by print instructions.

It is another object of the present invention to provide a print control system capable of cancelling a print instruction and optionally changing a print sequence so that chances of executing an unnecessary print operation can be reduced remarkably.

It is a further object of the present invention to provide a print control system capable of preferentially printing an urgent document.

The objects of the invention are achieved by a print control system having processing units, a memory unit, a display unit, an input unit and a printer, and capable of editing and printing operation, which comprises: a print request block for storing information necessary for each document to execute a print job; a print queue for managing the print request sequence of the print request block; file operating means for setting information necessary for a printing operation in the print request block according to a print request provided by the operator and registers the print request block in the print queue; print management means for fetching information set in the print request block according to the sequence registered in the print queue and for controlling the printer for to effect a printing operation on the basis of the information fetched from the print request block; printing status operating means for displaying the contents of the print queue on the display unit and for changing the print request according to an instruction given by the operator; and a system management means for activating file operating means, print control means and the printing status operating means according to instructions given by the operator and for controlling the execution of the printing operation.

The print request block and the print queue are provided in the memory unit and, preferably, the printing status operating means, the file operating means, the print management means and the system management means are programs to be executed by the processing units, respectively, stored in the memory unit.

The file operating means is a print instructing program for producing the print request block according to instructions given by the operator and adds the print request block to the print queue to accumulate print requests. The print management means is a print execution program for fetching the print request blocks sequentially from the print queue and drives the printer according to the contents of the print request block to print a corresponding document. The printing status operating means is a printing status operating program for changing the print request by removing a print request block from the print queue or changing the sequence of the print request blocks in the print queue. The system management means activates programs given by the operator by a system management program and controls the execution of the programs according to instructions given by the operator.

The print request block holds sufficient information for printing a document. The print request block has a link pointer and comprises, as sufficient information, a print file name, a print file class, a temporary print file name, a temporary print condition file name, a print program number, a print condition setting program number and print condition setting flags.

The print queue is a list construction employing the link pointers of the print request blocks.

The memory unit stores a print queue control table storing a print queue head indicating the first print request block of the print queue, a print queue tail indicating the last print request block of the print queue, and a print queue block number corresponding the number of print request blocks added to the print queue.

When a print instruction is given by the operator to the system management program of the system management means, the system management program activates the print instruction program of the file operating means to store a print request block in the print queue. When the print queue is not empty, the system management program activates the print execution program of the print management means to execute a print job.

In this state, the operator is allowed to give instructions to the system management program to add a further print instruction by activating the print instruction program and to conform or change instruction which has previously been given, by activating the printing status operating program.

Incidentally, applicant has also filed a U.S. application Ser. No. 063,115, for an invention entitled "SYSTEM FOR PRINTING DOCUMENTS" with the U.S. Patent and Trademark Office on June 17, 1987. This application is the convention application of Japanese Patent Application No. 61-140128.

BRIEF DESCRIPTION OF THE DRAWINGS

FIGS. 9A and 9B are typical diagrammatic representations of assistance in explaining a step of copying a work area to a print queue;

DETAILED DESCRIPTION OF THE PREFERRED EMBODIMENTS

Preferred embodiments of the present invention will be described hereinafter with reference to FIGS. 1 through 12.

Figure 12:
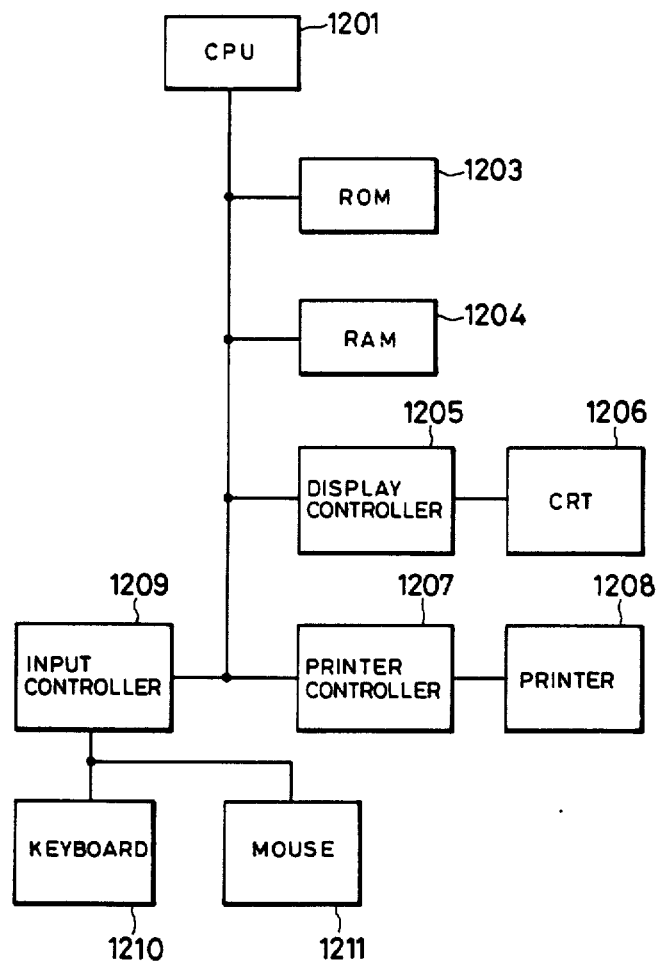
FIG. 12 is a block diagram showing the construction of a hardware, in a preferred embodiment, for carrying out the print management system of the present invention.

Referring to FIG. 12 showing the construction of a print management system, in a preferred embodiment, according to the present invention, the print management system comprises a central processing unit (hereinafter abbreviated to "CPU") 1201, a read-only memory (hereinafter abbreviated to "ROM") 1203, a random access memory (hereinafter abbreviated to "RAM") 1204, a display controller 1205, a cathode-ray tube (hereinafter abbreviated to "CRT") 1206, a printer controller 1207, a printer 1208, an input controller 1209, a keyboard 1210, and a mouse 1211.

The display controller 1205 controls the CRT 1206 to display information on the screen of the CRT 1206. The printer controller 1207 controls the printer 1208 for printing operation. The input controller 1209 controls the keyboard 1210 and the mouse 1211, namely, a pointing device, to accept character inputs, command inputs and display inputs.

The CPU 1201 controls the operation of the system according to programs stored in the ROM 1203 and the RAM 1204.

Figure 1:
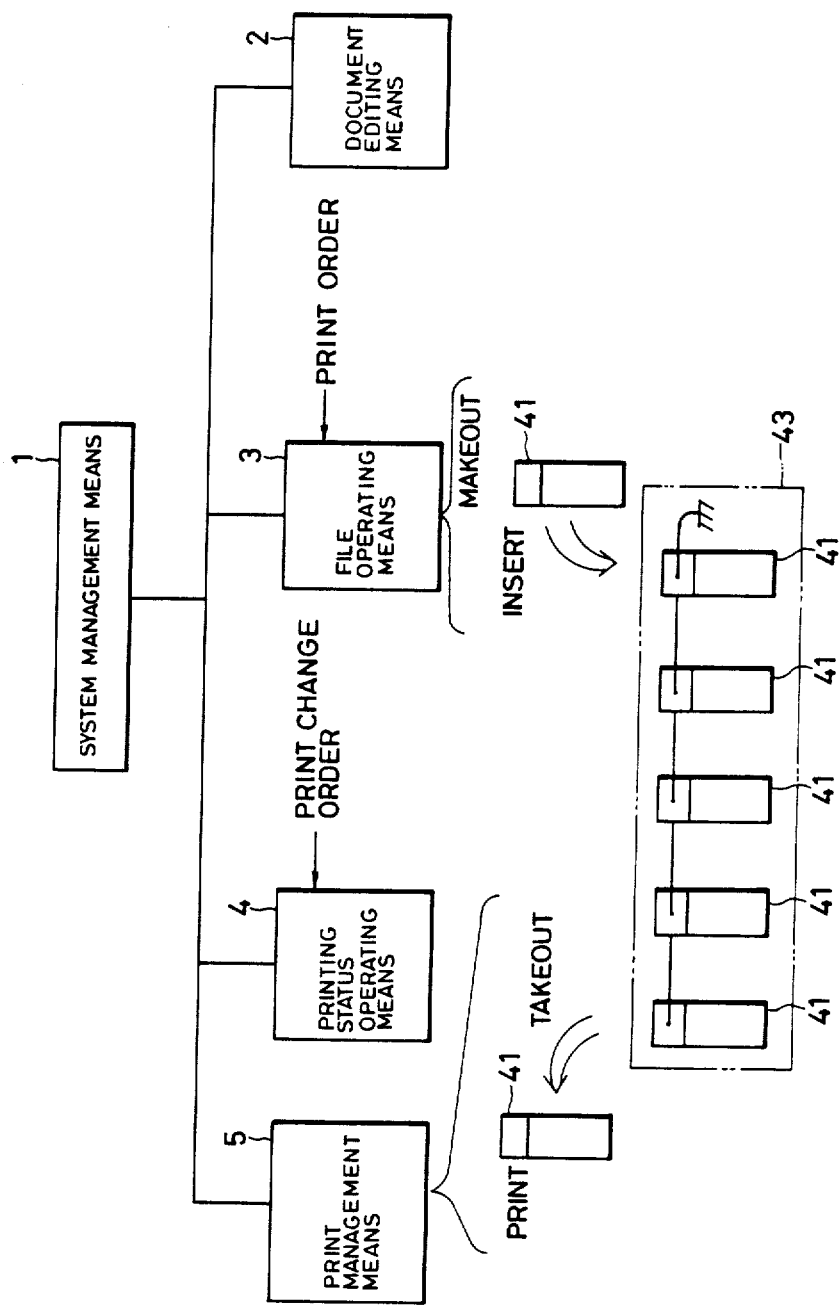
FIG. 1 is a block diagram showing the construction of a print management system, in a preferred embodiment, according to the present invention.

Referring to FIG. 1 typically showing the print control system, a system management means 1 activates the programs of a document editing means 2, a file operating means 3 and a printing status operating means 4 according to the program thereof, and manages the task area of a print queue 43.

The respective programs of the system management means 1, the document editing means 2, the file operating means 3, the printing status operating means 4 and the print management means 5 are stored in the ROM 1203 and the RAM 1204, and print request blocks (hereinafter abbreviated to "PRBs" 41 and the print queue 43 are stored in the RAM 1204. These programs, the PRBs 41 and the print queue 43 are controlled by the CPU 1201 for function.

The document editing means 2 edits, according to the program thereof, files for each of a series of controllable data for a document desired by the operator, in the RAM 1204.

The file operating means 3 operates the files stored in the RAM 1204 according to the program thereof for deleting and printing.

The print status operating means 4 functions according to the program thereof for cancelling a print request and changing the sequence of documents added to the print queue.

The print management means 5 activates, according to the program thereof, the printer controller 1207 to print documents by the printer 1208.

The PRB 41 is produced once every one print request provided by the operator to reserve the print request. The print queue 43 is a sequential arrangement of the PRBs 41 in a printing order for sequentially managing the execution of the print requests.

Figure 2:
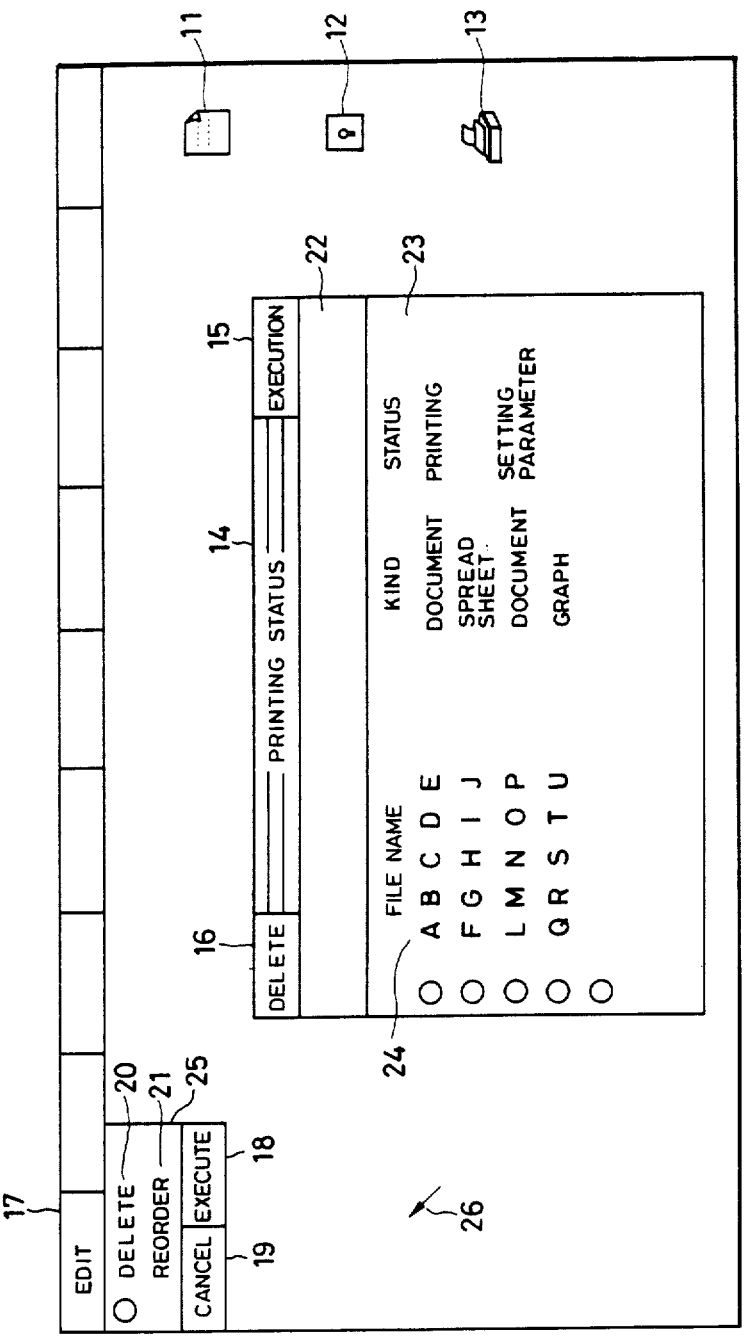
FIG. 2 is a typical illustration of an indication on a CRT according to the print management system of FIG. 1.

Referring to FIG. 2, an example of indication on the screen of the CRT 1206 during the print status operation, there are shown icons (picture words) 11, 12 and 13 representing a document editing program, a file operating program and a printing status operating program, respectively, a printing status display window 14, a window execution box 15, a window delete box 16, an edition menu 17, a pull-down menu 25, a menu execution box 18, a menu cancel box 19, menu items 20 and 21, a message display area 22, a print queue display area 23, a file name 24, and a mouse cursor 26.

The mouse cursor 26 is moved on the screen by operating the mouse 1211. A series of operations including moving the mouse cursor 26 to an area within the screen and pressing a button on the mouse 1211 will be referred to as an area designating operation.

The three icons 11, 12 and 13 are used for activating the corresponding programs. When the icons 11, 12 and 13 are designated, the system management means 1 activates the corresponding programs to execute steps defined by the programs.

A printing status is displayed in the printing status window 14 through the operation of the printing status operating means 4. Provided in the printing status display window 14 are the window execution box 15 and the window delete box 16 for indicating the end of the program of the printing status operating means 4, and the message display area 22 and the print queue display area 23 for displaying data according to the program.

Messages provided by the printing status operating means 4 are displayed in the message display area 22 for information to the operator. The status of the print queue 43 is displayed by the printing status operating means in the print queue display area 23. In the print queue display area 23, each line corresponds to one PRB 41, and the file names 24 are used for designating the lines, respectively.

The edition menu 17 is used for giving instructions to the printing status operating means 4. The major classification of the contents of an instruction is displayed in the edition menu 17, and the concrete contents of the instruction are displayed in the pull-down menu 25.

The pull-down menu 25 is displayed when the edition menu 17 is designated.

The pull-down menu 25 has the delete menu item 20 and reorder menu item 21 indicating the contents of an instruction given to the print status operating means 4, and the menu execute box 18 and the menu cancel box 19 for indicating the end of menu item selection.

To give an order to each of the above-mentioned means, an a menu item corresponding to the contents of the order, namely, either the menu item 20 or the menu item 21, is selected to designate the menu execute box 18. When an area on the screen is in a selected state, the display mode of the area is changed so that the display mode of the area can obviously be discriminated from the previous display mode. In FIG. 2, the objective items of selection are the menu items 20 and 21 and the file name 24.

Figure 3:
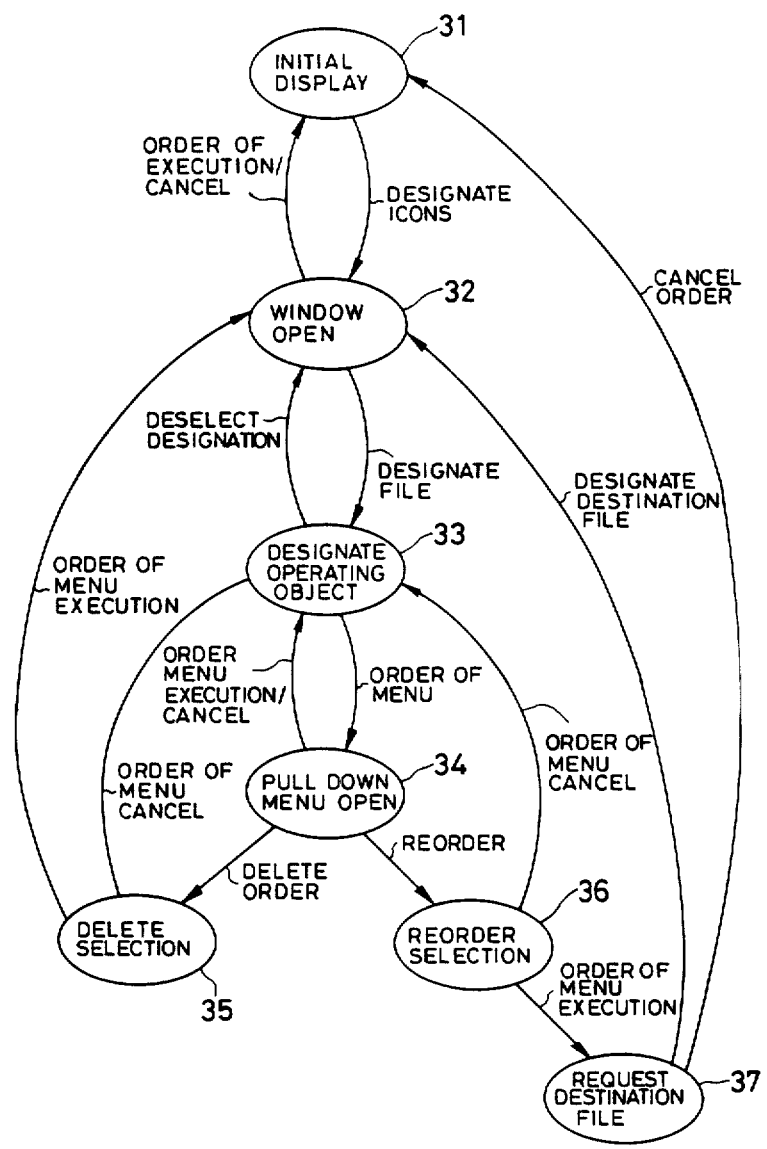
FIG. 3 is a state transition diagram of assistance in explaining the print management system of FIG. 1.

Referring to FIG. 3 showing the transition of state when the print request is changed by the operator, in a state 31, the icons 11, 12 and 13, and the mouse cursor 26 are displayed (FIG. 2).

In a state 32, the printing status display window 14 and the edition menu 17 are displayed additionally. In a state 33, one of the file names 24 is selected in the screen in the state 32. In a state 34, the pull-down menu 25 is displayed in addition to the display of the state 33.

In a state 35, the delete menu item 20 is selected in the screen in the state 34. In a state 36, the reorder menu item 21 is selected in the screen in the state 34. In a state 37, a message prompting the operator to designate a file name is displayed in the message display area 22 in the screen in the state 32.

Mode of state transition will be described hereinafter. When the icon 13 corresponding to the printing status operating means 4 is designated in the state 31, namely, an initial state, the system management means 1 activates the printing status operating means 4 to cause the state to change from the state 31 to the state 32. Then, in the state 32, the printing status operating means 4 displays the printing status display window 14 and the edition menu 17 according to the program, and then displays the file names 24 corresponding to the PRBs 41 added to the print queue 43 sequentially one by one to wait for an operator's designation.

Upon the designation of a file name 24 by the operator, the designated file name 24 changes to the selected state. If the file name 24 in the selected state is designated again, the selected state of the file name 24 is cancelled, and the state changes from the state 33 to the state 32. When another file name 24 is designated in the state 33, the selected state of the previously designated file name 24 is cancelled and the newly designated file name 24 changes to the selected state.

When the edition menu 17 is designated in the state 33, the pull-down menu 25 is displayed and the state changes from the state 33 to the state 34. When the delete menu item 20 is designated in the state 34, the delete menu item 20 changes to the selected state and the state changes from the state 34 to the state 35. When the reorder menu item 21 is designated in the state 34, the reorder menu item 21 changes to the selected state and the state changes from the state 34 to the state 36.

When the menu execute box 18 is selected in the state 35, the pull-down menu 25 is deleted, the PRB 41 corresponding to the file name 24 in the selected state is deleted from the print queue 43, a new print queue 43 is displayed in the print queue display area 23, and the state returns from the state 35 to the state 32.

When the menu execute box 18 is designated in the state 36, the pull-down menu 25 is deleted, a message is displayed in the message display area 22, and the state changes from the state 36 to the state 37.

When one of the file names 24 in the unselected state is designated in the state 37, the print queue 43 is rearranged so that the PRB 41 corresponding to the file name 24 in the selected state is positioned immediately before the PRB 41 corresponding to the designated file name 24, the selected state of the file name 24 is cancelled, a new print queue 43 is displayed, and then the state returns from the state 37 to the state 32.

When the menu cancel box 19 is designated in any one of the states 34, 35 and 36, the pull-down menu 25 is deleted and the state returns to the state 33. When the menu execute box 18 is designated in the state 34, the state returns to the state 33.

When the window execute box 15 is designated in the state 32, the printing status display window 14 and the edition menu 17 are deleted to end the program of the printing status operating means 4, and then the state returns to the state 31.

Similarly, when the window delete box 16 is designated in the state 32 or 37, the state returns to the state 31, all the changes made for the print queue 43 are cancelled and the state before the designation of the printing status operating icon 13 is restored.

The operations described hereinbefore are executed by the CPU 1201 according to the respective programs, which will be described later.

The construction of data for carrying out the print control system will be described hereinafter with reference to FIGS. 4A, 4B, 8A and 8B.

Figures 4A, 4B:
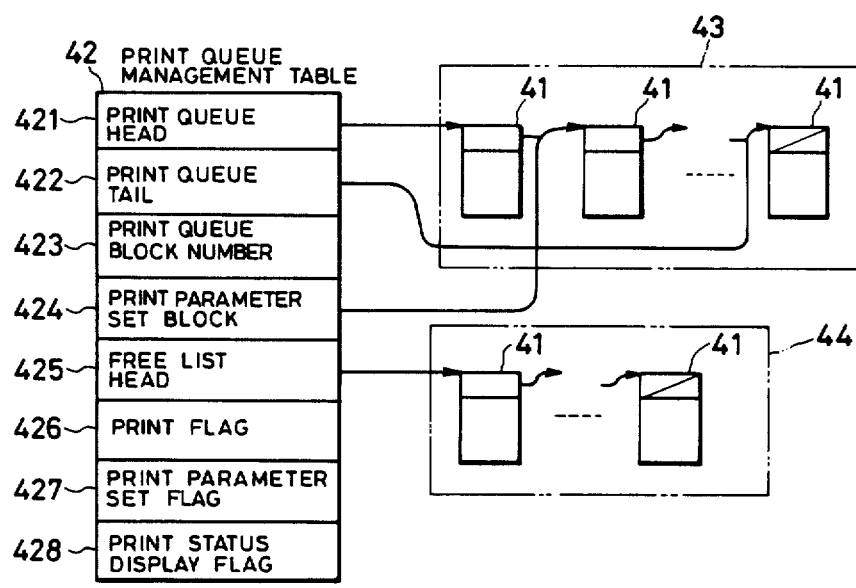
FIGS. 4A and 4B are diagrams typically showing the construction of data for carrying out the print management system of FIG. 1.

Referring to FIG. 4A, each PRB 41 contains a link pointer 411 for indicating the relation of the PRB 41 to other PRBs 41, a file name 412 to be printed, namely, information to be used by the print management means 5 for actual printing, a file kind 413 to be printed, a temporary file name 414 for printing, a temporary file name 415 for printing parameter, a print program number 416, a print parameter set program number 417 and a print parameter set flag 418.

Referring to FIG. 4B typically showing the print queue management table 42 and the print queue 43 which is managed according to the print queue management table 42, the print queue management table 42 is stored in the RAM 1204, as well as the PRB 41 and the print queue 43. The print queue management table 42 contains a print queue head 421, a print queue tail 422, a print queue block number 423, a print parameter set block 424, a free list head 425, a print flag 426, a print parameter set flag 427 and a print status display flag 428.

The PRBs 41 temporarily reserve print requests provided by the operator. The number of the PRBs 41 is equal to the maximum number of print requests in a queue accepted by the system.

The print queue 43 is a list of PRBs 41 sequentially arranged in the order of the link pointers 411. The first PRB 41 and the last PRB 41 in the print queue 43 are indicated by the print queue head 421 and the print queue tail 422, respectively. The print queue block number 423 indicates the number of PRBs 41 of the print queue 43.

A free list 44 is an arrangement of the PRBs 41 other than those added to the print queue 43. The first PRB 41 in the free list 44 is indicated by the free list head 425.

At the moment of activation of the system, all the PRBs 41 are added to the free list 44 and the print queue 43 is empty. When a print request is given, a corresponding PRB 41 is removed from the free list 44 and is added to the tail of the print queue 43. The print priority of the PRB 41 indicated by the print queue head 421 is the highest and the print priority of the PRB 41 indicated by the print queue tail 422 is the lowest in the print queue 43. Upon the completion of printing a document, a corresponding PRB 41 is removed from the print queue 43 and is added to the free list 44.

When the PRB 41 indicated by the print queue head 421 is in a printing process, the print flag 426 is set. When the PRB 41 indicated by the print parameter set block 424 is in a print parameter setting process, the print parameter set flag 427 is set. When the printing status operating means 4 is operating the print queue 43, the print status display flag 428 is set. The flags 426, 427 and 428 are used for managing the contention of operating the print queue 43.

Figure 8A:
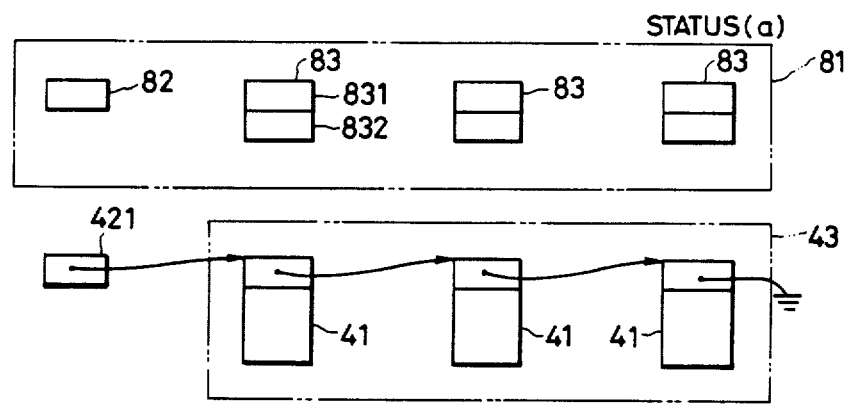
FIGS. 8A and 8B are typical diagrammatic representations of assistance in explaining a step of copying a print queue to a work area in the flow chart of FIG. 5.
Figure 8B:
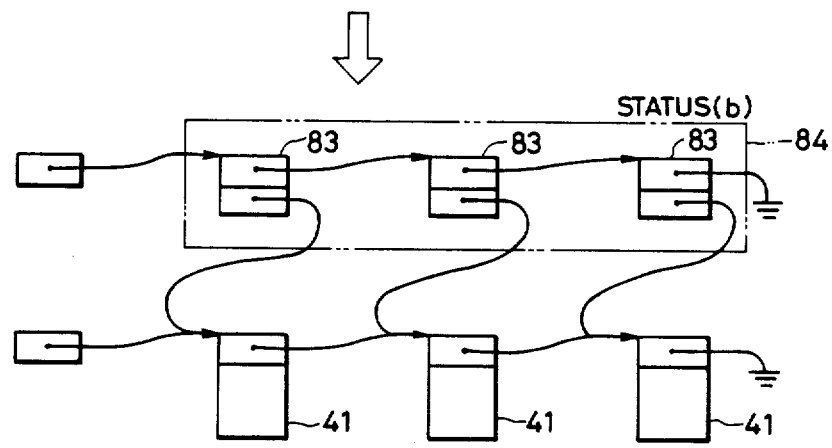

FIGS. 8a and 8B typically illustrate the respective data constructions of a work area 81 and the print queue 43 which are used by the printing status operating means 4.

Referring to FIG. 8A, the work area 81 is a data area in the RAM 1204, comprising a work queue header (hereinafter abbreviated to "WQH") 82 and work queue blocks (hereinafter abbreviated to "WQBs") 83. The WQB 83 includes a link pointer 831 and a PRB pointer 832. The number of the WQBs 83 included in the work area 81 is the same as that of the PRBs 41. The WQBs 83 are used for forming a work queue 84, which will be described hereinafter.

The work queue 84 is a list of WQBs 83 arranged in the order of the link pointers 831 and the first WQB 83 is indicated by WQH 82. Each WQB 83 of the work queue 84 and a corresponding PRB 41 are interrelated by the PRB pointer 832, so that the work queue 84 is an indirect list of the PRBs 41.

The work queue 84 is used in a task for changing the print queue 43. The process of change from a status (a) shown in FIG. 8A to a status (b) shown in FIG. 8B will be explained in conjunction with the explanation of the program loaded in the printing status operating means 4.

Figure 5:
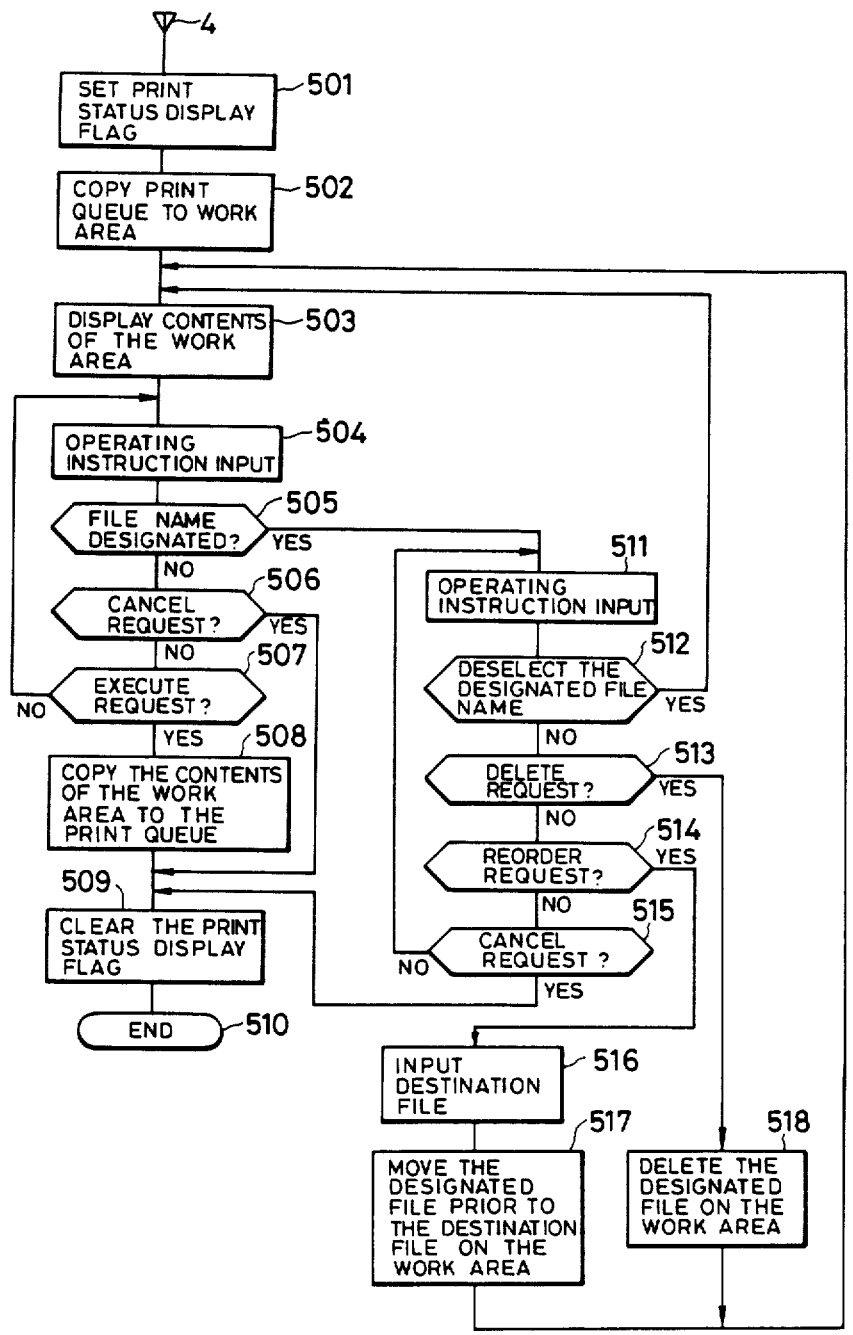
FIG. 5 is a flow chart showing an example of the printing status operating means 4 of the print management system of FIG. 1.

FIG. 5 shows a flow chart of the program loaded in the printing status operating means 4 for carrying out the functions illustrated in the state transition diagram of FIG. 3. The steps of the program loaded in the printing status operating means will be described hereinafter.

In step 501, the print status display flag 428 is set to indicate that the print queue 43 is being operated. In step 502, the print queue 43 is copied to the work area 81 to produce the work queue 84. FIG. 8A shows a status (a) of the print queue 43 before being copied and FIG. 8B shows a status (b) of the same after being copied.

In the status (a), no significant information is stored in the work area 81. In the status (b) the work queue 84 is formed in the work area 81. Each WQB 83 of the work queue 84 corresponds to each PRB 41 of the print queue 43, and the arrangement of the PRBs 41 in the print queue 43 is identical with that of the corresponding WQBs 83 in the work queue 84.

Referring again to FIG. 5, the printing status display window 14 and the edit menu 17 are displayed on the screen, and the status of the work queue 84 is displayed in the print queue display area 23.

Thus, the printing status operating means 4 operates the print queue 43 indirectly through the operation of the work queue 84, namely, the copy of the print queue 43, and updates the print queue 43 to end the program.

In step 504, the routine waits for an instruction. This state corresponds to the state 32 of FIG. 3.

When an instruction is given by the operator by operating the mouse 1211 or the keyboard 1210, the contents of the instruction are discriminated in steps 505 through 507 to execute procedures according to the instruction.

When the instruction is a window cancel request, the program goes to step 509. In this case, all the instructions for changing the print queue 43 become invalid and the print queue 43 is restored to a state before the activation of the printing status operating means 4. At this stage, since the contents of the print queue 43 are not changed at all, no operation is executed to restore the print queue to its original status.

In step 509, the print status display flag 428 (FIG. 4B) is cleared and the printing status display window 14 and the edit menu 17 are erased, and then the program of the printing status operating means 4 is ended in step 510 to establish the state 31 of FIG. 3.

When the instruction is a window execute request (step 507), the program goes to step 508, wherein the print queue 43 is changed. Then, steps 509 and 510 are executed to end the program.

A procedure for copying the contents of the work area 81 to the print queue 43 in step 508 will be described later with reference to FIGS. 9A and 9B.

When the file name 24 is designated by the instruction, the designated file name is brought to a selected state as an objective of the editing operation, and then the program waits for an instruction in step 511. This state corresponds to the state 33 of FIG. 3.

The contents of an instruction given in step 511 are discriminated in steps 512 through 515, and then the control procedure is executed according to the contents of the instruction. When the instruction designates the edit menu 17, menu items are given by using the pull-down menu 25.

When the instruction designates the file name 24 in the selected state, a decision is made in step 512 whether the instruction requests the cancellation of the file name 24 in the selected state. When the decision in step 512 is "Yes", the designation of the PRB 41 which has been selected as the objective of the operation is cancelled, and then the program returns to step 503.

When the instruction designates the delete menu item 20, a decision is made in step 513 whether the instruction requests deleting of the menu item 20. If so, the WQB 83 designating the objective PRB 41 is removed from the work queue 84, and then a new work queue 84 is displayed in step 503.

When the instruction is a reorder menu request, the decision in step 514 is "yes". Then, a message prompting the operator to designate a file is displayed in the message display area 22. This state corresponds to the state 37 of FIG. 3.

When the file name 24 is designated by the operator, the work queue 84 is rearranged to bring the WQB 83 indicating the objective PRB 41 to a position before the WQB 83 indicating the PRB 41 corresponding to the designated file name 24. Then, the message displayed in the message display area 22 is erased, and then a new work queue 84 is displayed in step 503.

When the instruction requests the cancellation of the window, the decision in step 515 is "Yes". Then, similarly to the result of decision in step 506, the program goes to step 509 and the program is ended in step 510.

Thus, the printing status operating means 4 carries out the functions illustrated in FIG. 3.

Figure 6:
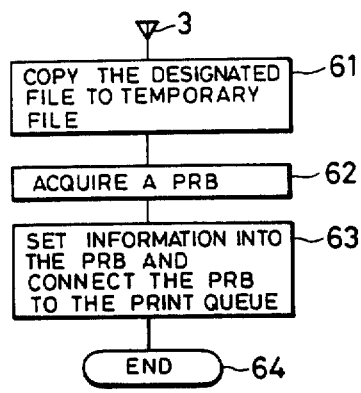
FIG. 6 is a flow chart showing an example of the file operating means 3 of the print management system of FIG. 1.

Referring to FIG. 6 showing a flow chart of a program loaded in the file operating means 3, when activated by the system management means 1, the file operating means 3 receives an input designating a file name of a document to be printed from the operator in step 61 and produces a temporary copy of the file indicated by the designated file name.

In step 62, one of the PRBs 41 included in the unused list 44 (FIG. 4B) is fetched for use in the subsequent processes.

In step 63, the objective file name 412, objective file kind 413, temporary file name for printing 414, print program number 416, print parameter set program number 417 and print parameter set flag 418 of the fetched PRB 41 are set, the PRB 41 is added to the print queue 43 at the tail, and the number of the print queue blocks is increased by an increment of one. Then, in step 64, the program of the file operating means 3 for issuing a print request is ended.

Figure 7:
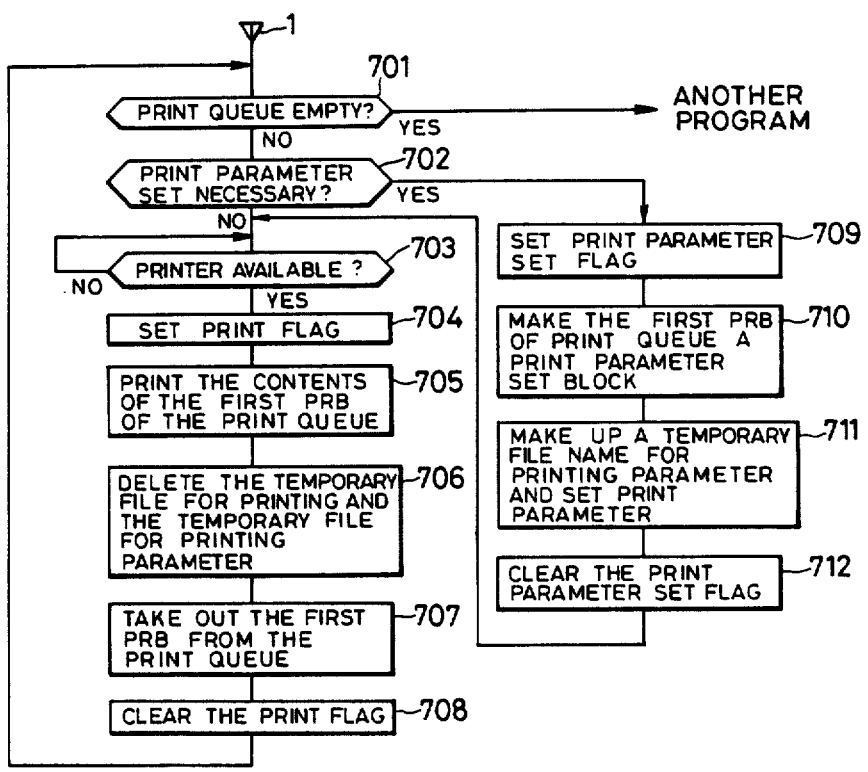
FIG. 7 is a flow chart showing the essential portion of an example of the system management means 1 of the print management system of FIG. 1.

Referring to FIG. 7 showing a program to be executed by the system management means 1 for print control, a decision is made in step 701 whether the print queue 43 is empty. If so, the system management executes another program for system management and, if not, a decision is made in step 702 from the status of the print parameter set flag 418 whether print parameters need be set for the head PRB 41 of the print queue 43. If so, print parameters are set in steps 709 through 712, and then the program goes to step 703.

In step 709, the print parameter set flag 427 is set, and then the head PRB 41 is assigned to the print parameter set block 424 in step 710.

Then, in step 711, a print parameter setting program of a print parameter set program number 417 corresponding to the objective print file kind 413 is executed, and then the file name of a file storing print parameters determined through the execution of those programs according to instructions given by the operator is set as the temporary file name 415 for printing parameters.

Then, in step 712, the print parameter set flag 427 is cleared to end the program for setting print parameters.

In step 703, a decision is made whether the printer 1208 is available and the program is suspended until the printer 1208 becomes available.

Actual printing is executed in steps 704 through 708. In step 704, the print flag 426 is set to indicate that the printer 1208 is in a printing process, and then the print management means 5 (FIG. 1) is activated in step 705. The print management means 5 controls the printer controller 1207 and the printer 1208 to carry out the printing operation according to the contents of the PRB 41.

In step 706, the temporary file which has become unnecessary is deleted by deleting the temporary file name 414 for printing and the temporary file name 415 for printing parameter.

Subsequently, the head PRB 41 is removed from the print queue 43, the removed PRB 41 is added to the unused list 44, and the print queue block number 423 is reduced by a decrement of one in step 707.

In step 708, the print flag 426 is cleared to end the printing cycle for the PRB 41. Subsequently, the program returns to step 701 to repeat the program until the print queue 43 becomes empty. Thus, the print request is executed.

Procedures to be executed in step 508 of the program of the printing status operating means 4 shown in FIG. 5 will be described in detail with reference to FIGS. 9A showing a status (a) before copying and FIG. 9B showing a status (b) after copying.

In the status (a), the arrangement of the PRBs 41 corresponding to the WQBs 83 in the work queue 84 is different from that of the PRBs 41 in the print queue 43; in the status (b), the arrangement of the PRBs 41 in the print queue 43 is the same as that of the corresponding PRBs 41 in the work queue 84.

Figure 10A:
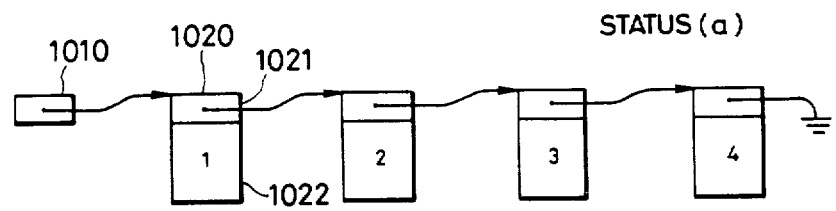
FIGS. 10A and 10B are typical diagrammatic representations of assistance in explaining steps of deleting data from print queue in the flow charts of FIGS. 5, 6 and 7.
Figure 10B:
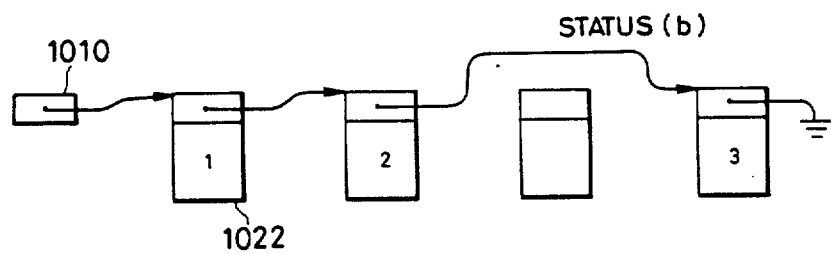

In FIGS. 10A and 10B illustrating a block deleting procedure for deleting a block from a generalized queue, a status of the queue before deleting is represented by a status (a), and a status of the queue after deleting is represented by a status (b). Numerals written in block bodies 1022 indicate the respective orders of the block bodies 1022 in the queue. As shown in FIGS. 10A and 10B, the link pointer 1021 of the second block 1020 is rewritten to delete the third block 1020 from the queue.

Figure 11A:
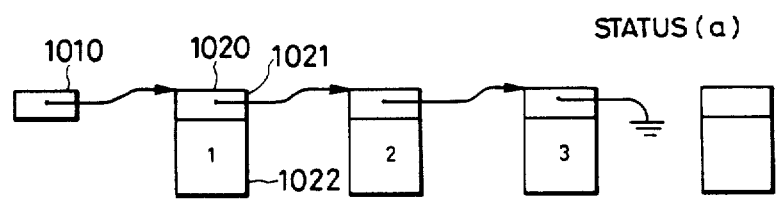
FIGS. 11A and 11B are typical diagrammatic representations of assistance in explaining steps of data insertion in the print queue in FIGS. 5, 6 and 7.
Figure 11B:
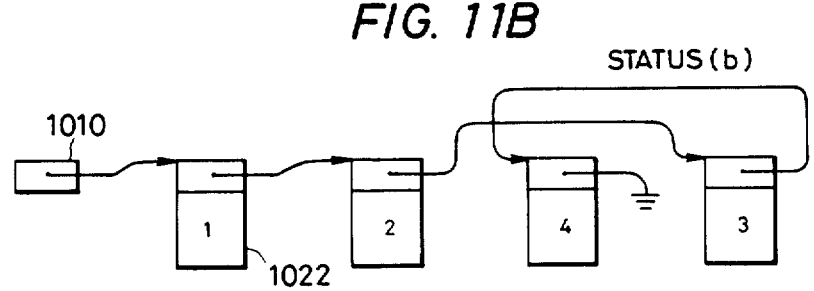

In FIGS. 11A and 11B illustrating a block adding procedure for adding a block to a generalized queue, a status of the queue before addition is represented by a status (a), and a status of the queue after addition is represented by a status (b). The respective link pointers 1021 of the second block 1020 and an additional block 1020 are rewritten to add the additional block 1020 to the queue before the third block 1020.

The procedure shown in FIGS. 10A and 10B is executed in step 518 (FIG. 5), step 62 (FIG. 6) and step 707 (FIG. 7). The procedure shown in FIGS. 11A and 11B is executed in step 517 (FIG. 5) and step 63 (FIG. 6).

Thus, this embodiment enables the operator to change the print request which has previously been provided after confirming the printing conditions on the screen of the display and to cancel instructions once given for changing the print request, so that the accessibility of the printer is improved remarkably.

As apparent from the foregoing description, according to the present invention, a designated document name can be confirmed after a print instruction has been provided, and the arbitrary cancellation of instructions and the arbitrary change of the print sequence of documents in a print queue are possible. Accordingly, the present invention avoids an unnecessary printing operation and enables the preferential printing of an urgent document to reduce waiting time.

What is claimed is:

1. A print control system for controlling a document editing and printing operation of a computer system which includes a processing unit, a memory unit, a display unit, an input unit and a printer, said print control system comprising:

a plurality of print request blocks provided in said memory unit, each print request block including information necessary for printing a respective document;

a print queue provided in said memory unit for storing print request blocks in the order of execution of printing of documents respectively corresponding to the print request blocks;

file operating means for setting a print request given by an operator in a print request block together with said information necessary for printing the document designated by the print request, and for registering the print request block in said print queue;

print managing means for fetching information set in said print request blocks according to the order of said print request blocks in said print queue, and for controlling said printer for printing according to the fetched information;

printing status operating means for transferring the contents of said print queue to the display unit, and for changing said print queue by varying the order of or deleting one of said print request blocks in conformity to instructions given through said input unit by the operator; and system managing means for controlling the printing operation by activating and controlling said file operating means, said print managing means and said printing status operating means in conformity to instructions given through said input unit by the operator.

2. A print control system according to claim 1, wherein said print request blocks have link pointers indicating an interrelation between the print request blocks, and said print queue has a list structure formed by connecting said print request blocks by using the link pointers.

3. A print control system according to claim 1, wherein said print request block has, as information necessary for a printing operation, an objective file name, an objective file kind, a temporary file name for printing, a temporary file name for printing parameters, a print program number, a print parameter set program number and a print parameter set flag.

4. A print control system according to claim 2, further comprising a print queue management table provided in said memory unit for storing a print queue head indicator for indicating the first print request block of said print queue, a print queue tail indicator for indicating the last print request block of said print queue, and a print queue block number cumulatively representing the number of the print request blocks of said print queue.

5. A print control system for controlling the document editing operation of a computer system, comprising a processing unit, memory means, display means and input means, said print control system comprising:

printing means for printing an edited document;

print request blocks provided in said memory means, each of said print request blocks storing information necessary for printing a respective edited document;

an area provided in said memory means for managing the printing order of said print request blocks;

a print request program stored in said memory means for execution by said processing unit, said print request program operating to set information necessary for printing a document designated by a print request in said print request block and registering the relevant print request block in said area;

a print execute program stored in said memory means for execution by said processing unit, said print execute program operating to fetch information sequentially from said print request blocks in the order of registration of said print request blocks in said area, and controlling said printing means for printing operation according to the information fetched from said print request blocks;

a printing status operating program stored in said memory means for execution by said processing unit, said printing status operating program operating to display the contents of said area on said display means, and changing the print execute order of said print request blocks defined by information provided in said area; and a system management program stored in said memory means for execution by said processing unit, said system management program operating to activate said print request program, said print execute program and said printing status operating program according to instructions provided by means of said input means, and controlling the printing operation.

6. A print control system according to claim 5, wherein said area for managing the print execute order comprises a print queue formed by connecting said print request blocks, and a print queue management table.

7. A print control system according to claim 6, wherein said print request blocks each has a link pointer indicating the relation thereof to other print request blocks, and said print queue management table has a print queue head indicator indicating the first print request block of said print queue, and a print queue tail indicator indicating the last print request block of said print queue.

8. A print control system according to claim 7, wherein said print queue has a list construction formed by connecting said print request blocks by using said link pointers.

9. A print control system according to claim 6, wherein said print request blocks each has, as information necessary for printing a corresponding document, at least an objective print file name and an objective file kind.

10. A print control system according to claim 9, wherein said printing status operating program displays at least said objective print file name, said objective file kind and said print execute order on said display means on the basis of said print queue, the contents of said print request blocks, and those of said print queue management table.

11. A print control system for controlling a document editing operation of a computer system including processing means, memory means, display means, input means, and printing means for printing edited documents, the print control system comprising:

first means in said processing means for executing a print request program stored in a program area of the memory means for setting information, which is necessary for printing each of said edited documents pointed out through the input means by an operator, as a print request block in a data area of the memory means, and for registering said print request block in a print queue in the data area o the memory means;

second means in said processing means for executing a print execute program stored in the program area of the memory means for fetching said information from each of said print request blocks sequentially in accordance with the order in which said print request blocks are registered in said print queue, and for controlling said printing means for printing each of said edited documents in accordance with said information fetched from each of said print request blocks;

third means in said processing means for executing a printing status operating program stored in the program area of the memory means for displaying the contents of said data area on the display means, and changing the order of or deleting one of said print request blocks in said print queue in accordance with indications via the input means from the operator; and fourth means in said processing means for executing a system management program stored in the program area of the memory means for selecting said print request program, said print execute program, or said printing status operating program in accordance with instructions provided via the input means by the operator.

12. A print control system according to claim 11, wherein said print request blocks each has a link pointer indicating the relation thereof to other print request blocks in said print queue, and said print queue has a list construction formed by connecting said print request blocks by using said link portions.

13. A print control system according to claim 12, wherein said print request blocks each has, as information necessary for printing a corresponding document, at least an objective print file name and an objective file kind.

14. A print control system according to claim 13, wherein said printing status operating program displays at least said objective print file name, said objective file kind and said print execute order on said display means on the basis of said print queue, the contents of said print request blocks, and those of said print queue management table.

15. A print control system according to claim 11, wherein said memory means stores a print queue management table having a print queue had indicator indicating the first print request block of said print queue and a print queue tail indicator indicating the last print request block of said print queue.

* * * * *